US011704649B2

(12) United States Patent
Hay et al.

(10) Patent No.: US 11,704,649 B2
(45) Date of Patent: Jul. 18, 2023

(54) CONTACTLESS PAYMENT RELAY ATTACK PROTECTION

(71) Applicant: MASTERCARD INTERNATIONAL INCORPORATED, Purchase, NY (US)

(72) Inventors: Florent Hay, Laeken (BE); Eddy Van De Velde, Leuven (BE); Patrick Mestre, Sart-Bernard (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 175 days.

(21) Appl. No.: 17/011,618

(22) Filed: Sep. 3, 2020

(65) Prior Publication Data
US 2022/0067687 A1 Mar. 3, 2022

(51) Int. Cl.
*G06Q 20/20* (2012.01)
*G06Q 20/34* (2012.01)
(Continued)

(52) U.S. Cl.
CPC ....... *G06Q 20/204* (2013.01); *G06F 11/3006* (2013.01); *G06F 11/3419* (2013.01);
(Continued)

(58) Field of Classification Search
None
See application file for complete search history.

(56) References Cited

U.S. PATENT DOCUMENTS 7,685,071 B2 * 3/2010 Terauchi ............... H04L 9/0872 713/160
9,600,808 B1 * 3/2017 Gomez, Sr. ............ G06Q 20/00
(Continued)

FOREIGN PATENT DOCUMENTS

EP 3163526 A1 * 5/2017
JP 2004272695 A 9/2004
JP 2015082233 A 4/2015

OTHER PUBLICATIONS

Urien et al (A Breakthrough for Prepaid Payment: End to End Token Exchange and Management Using Secure SSL Channels Created by EAP-TLS Smart Cards ) (Year: 2011).*
(Continued)

*Primary Examiner* — Mamon Obeid
(74) *Attorney, Agent, or Firm* — Talem IP Law, LLP

(57) ABSTRACT

A method for contactless payment relay attack protection includes receiving an online authorization request including a cryptogram, a measured processing time, and a reference processing time from a terminal. The cryptogram is verified, and a determination is performed as to whether the measured processing time exceeds the reference processing time. An online authorization response authorizing or declining a monetary transaction is transmitted, based on the determination. An artificial intelligence transaction analysis can be performed based on past and current conditions (e.g., battery level, operating system, open applications) of a payment device such as a mobile phone, past and current conditions of a terminal, and/or a monetary amount. The online authorization response can be based on the artificial intelligence transaction analysis.

5 Claims, 13 Drawing Sheets

(51) Int. Cl.
    *G06Q 20/40*         (2012.01)
    *G06Q 20/38*         (2012.01)
    *G06F 11/34*         (2006.01)
    *G06F 11/30*         (2006.01)
    *G06N 20/00*         (2019.01)
    *H04W 12/122*      (2021.01)
    *G06Q 20/36*         (2012.01)
    *G06Q 20/32*         (2012.01)

(52) U.S. Cl.
    CPC .......... *G06N 20/00* (2019.01); *G06Q 20/202* (2013.01); *G06Q 20/3415* (2013.01); *G06Q 20/3825* (2013.01); *G06Q 20/3829* (2013.01); *G06Q 20/4016* (2013.01); *H04W 12/122* (2021.01); *G06Q 20/3226* (2013.01); *G06Q 20/352* (2013.01); *G06Q 20/36* (2013.01); *G06Q 2220/00* (2013.01)

(56) References Cited

U.S. PATENT DOCUMENTS

| | | | | |
|---|---|---|---|---|
| 10,043,182 | B1* | 8/2018 | Bharghavan | G06Q 20/4015 |
| 10,217,110 | B1* | 2/2019 | Chen | G06Q 20/202 |
| 10,242,368 | B1* | 3/2019 | Poole | G06Q 20/405 |
| 10,262,311 | B1* | 4/2019 | Cronin | G06Q 20/3278 |
| 10,671,988 | B2* | 6/2020 | Venugopalan | G06Q 20/3274 |
| 11,068,895 | B2* | 7/2021 | Kinagi | G06Q 20/4015 |
| 2007/0118483 | A1* | 5/2007 | Hill | G06Q 20/40 705/64 |
| 2008/0040285 | A1* | 2/2008 | Wankmueller | G06Q 20/3674 705/67 |
| 2013/0191290 | A1* | 7/2013 | Glendenning | H04L 9/3247 705/71 |
| 2013/0212025 | A1* | 8/2013 | Tanner | G06Q 20/401 705/44 |
| 2014/0040146 | A1* | 2/2014 | Fiske | G06Q 20/326 705/67 |
| 2014/0040149 | A1* | 2/2014 | Fiske | G06Q 20/3829 705/71 |
| 2015/0073995 | A1* | 3/2015 | Hayhow | G06Q 20/3821 705/71 |
| 2015/0170016 | A1* | 6/2015 | Avagliano | G07F 7/0833 705/41 |
| 2015/0180836 | A1* | 6/2015 | Wong | G06Q 20/385 713/172 |
| 2015/0363771 | A1* | 12/2015 | Graylin | G06Q 20/326 705/65 |
| 2016/0239833 | A1* | 8/2016 | Venugopalan | G06Q 20/38215 |
| 2017/0200160 | A1* | 7/2017 | Kumar | G06Q 20/227 |
| 2018/0006821 | A1* | 1/2018 | Kinagi | G06Q 20/4015 |
| 2018/0165673 | A1* | 6/2018 | Francis | G06Q 20/3278 |
| 2019/0207953 | A1* | 7/2019 | Klawe | G07F 7/088 |
| 2019/0362341 | A1* | 11/2019 | Chen | H04L 63/1441 |
| 2019/0370790 | A1* | 12/2019 | Spector | H04L 9/3215 |
| 2019/0385161 | A1* | 12/2019 | Gleeson | G06Q 20/20 |
| 2020/0092324 | A1* | 3/2020 | Jin | H04L 63/108 |
| 2021/0042753 | A1* | 2/2021 | Wong | H04L 9/3247 |
| 2021/0312448 | A1* | 10/2021 | Kinagi | G06Q 20/223 |
| 2022/0067687 | A1* | 3/2022 | Hay | G07F 7/0893 |
| 2022/0270076 | A1* | 8/2022 | Zarakas | G06N 5/02 |

OTHER PUBLICATIONS

A protocol for mutual authentication between NFC phones and POS terminals for secure payment transactions (Year: 2012).*

International Search Report and Written Opinion issued in International Application No. PCT/US2021/046268, dated Nov. 2, 2021, 13 Pages.

Tom Chothia et al., "Relay Cost Bounding for Contactless EMV Payments", 19th International Conference Finanical Cryptography and Data Security, Jan. 26-30, 2015, 22 pages, Puerto Rico, retrieved from: http://www.cs.bham.ac.uk/~tpc/Relay/.

Bancomat, Bancontact Company, Bankaxept, Borica, EURO 6000, Girocard/SRC, Groupement Des Cartes Bancaires CB, Servired, SIBS MB and SISTEMA 4B, "Common Payment Application Contactless Extension", Oct. 18, 2017, 252 pages, Version 1.0, retrieved from: https://www.europeancardpaymentassociation.com/wp-content/uploads/2017/11/CPACE-DIC_V1.0_171018.pdf.

* cited by examiner

CONTACTLESS PAYMENT RELAY ATTACK PROTECTION

BACKGROUND

Contactless payment technology usage and availability has increased dramatically. When using a contactless device, a relay attack is possible. In general, a relay attack refers to the interception of information and relaying that information to another device by an attacker.

Implementations of such attacks include skimming data from a contactless card to pay for goods or services without the cardholder being aware of this payment. Such an attack is bad press for payment card networks and creates mistrust of contactless technology.

Current relay resistance protection implements a combined dynamic data authentication (DDA) and generation of an application cryptogram (Combined Data Authentication—CDA) card authentication. Such systems rely on local (e.g., offline) data authentication mechanisms to guarantee that different timings communicated between the card and the terminal have not been altered. The focus on the timings is useful because the time it takes to intercept valid payment information and relay that information to another device is different than normal operation of a payment.

The CDA relay protection consists of sending a random value and receiving a random value, measuring a time, and comparing the time to a reference timing provided by a card. The random values are signed by the card, such as with a Rivest-Shamir-Adleman (RSA) signature. The CDA relay protection mechanism is designed for working off-line, which means that if a point-of-sale terminal detects or suspects a relay attack, it generally declines the interaction.

Merchants and acceptance device manufacturers often resist incorporating local data authentication such as the CDA relay protection due to the complexity introduced by the CDA relay protection, which relies on a public key infrastructure (PKI) and uses an issuer root certificate installed on an acceptance device.

Furthermore, with the rise of computing devices, such as smart phones, in performing monetary transactions, including contactless transactions, the current relay resistance protection can suffer from false positives and false negatives due to inconsistencies between devices or even between different uses of the same device. For example, the timing of sending and receiving the random value when performing the relay resistance protection can vary because the processing time can vary from one model of device to another, because the user has many applications open simultaneously (impacting device performance), or because the battery level on the device is too low (which can also have an impact on the device performance).

BRIEF SUMMARY

Contactless payment relay attacks protection is provided. The described systems and methods support the protection of transactions against relay attacks for contactless payments using effectively any contactless payment device—whether a physical card or a computing device. By providing an online approach, the described protection does not require off-line, local data authentication, which helps avoid complicated and costly changes at a point of sale (POS) terminal.

During a monetary transaction at a contactless payment-enabled terminal using a payment device, such as a payment card or computing device, the contactless payment-enabled terminal can communicate online with a protection server to provide relay resistance protection.

A method implemented at a payment device can include receiving a send response command to send a response in a monetary transaction; processing the send response command; sending the response, which includes a reference processing time indicating an amount of time taken to process the send response command; receiving an application cryptogram generation command including a measured processing time that indicates an amount of time from a sending by a source of the send response command to a reception by the source of the reference processing time; generating a cryptogram using the measured processing time; and sending the cryptogram. In a specific implementation, the send response command is an EXCHANGE RELAY RESISTANCE DATA (ERRD) command.

In some cases, artificial intelligence is implemented on the payment device to learn and generate a suitable reference processing time taking into account varying device states, or conditions, of the payment device. The artificial intelligence may include supervised learning (e.g., of time measured by a terminal that the payment device communicates with) and regression analysis using dependent variables of processing times (e.g., to process a command and transmit a response) and independent variables of conditions of the payment device (e.g., number of applications open, battery level, power mode, etc.).

A method implemented at a contactless payment-enabled terminal can include transmitting a request for a reference processing time for a monetary transaction (e.g., the send response command, which may be an ERRD command); receiving the reference processing time; transmitting a request for an application cryptogram, the request for the application cryptogram including a measured processing time; receiving the application cryptogram; sending an online authorization request including the application cryptogram and indicating the measured processing time and the reference processing time; receiving an online authorization response that indicates whether the transaction is authorized; and indicating whether the monetary transaction is authorized. The online authorization request can be sent to a protection server that performs processes to determine whether the transaction should be authorized.

In some cases, the online authorization request can include a monetary amount of the monetary transaction. In some cases, additional information, such as device state/conditions of the payment device and/or the terminal can be included in a communication to the protection server.

A method implemented at a protection server can include receiving an online authorization request including a cryptogram, a measured processing time, and a reference processing time; verifying the cryptogram; performing a determination whether the measured processing time exceeds the reference processing time; and transmitting an online authorization response based on the determination, wherein the online authorization response authorizes or declines a monetary transaction.

In some cases, an artificial intelligence (AI) transaction analysis is performed at the protection server to provide a confidence assessment regarding potential fraud with respect to the determination of whether the measured processing time exceeds the reference processing time. The AI transaction analysis can, for example, evaluate the extent that the measured processing time may exceed the reference time and whether the user is performing a transaction that appears to be usual or exotic. In some cases, the AI transaction analysis can, when such information is permitted to be provided to the protection server, take into consideration past and current conditions of the payment device (e.g., state information of the payment device, such as an operating system version, a battery level, a number of open applications, and a type of each open application).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Contactless payment relay attacks protection is provided. The described systems and methods support the protection of transactions against relay attacks for contactless payments using effectively any contactless payment device—whether a physical card or a computing device. By providing an online approach, the described protection does not require off-line, local data authentication, which helps avoid complicated and costly changes at a point of sale terminal.

Figure 1:
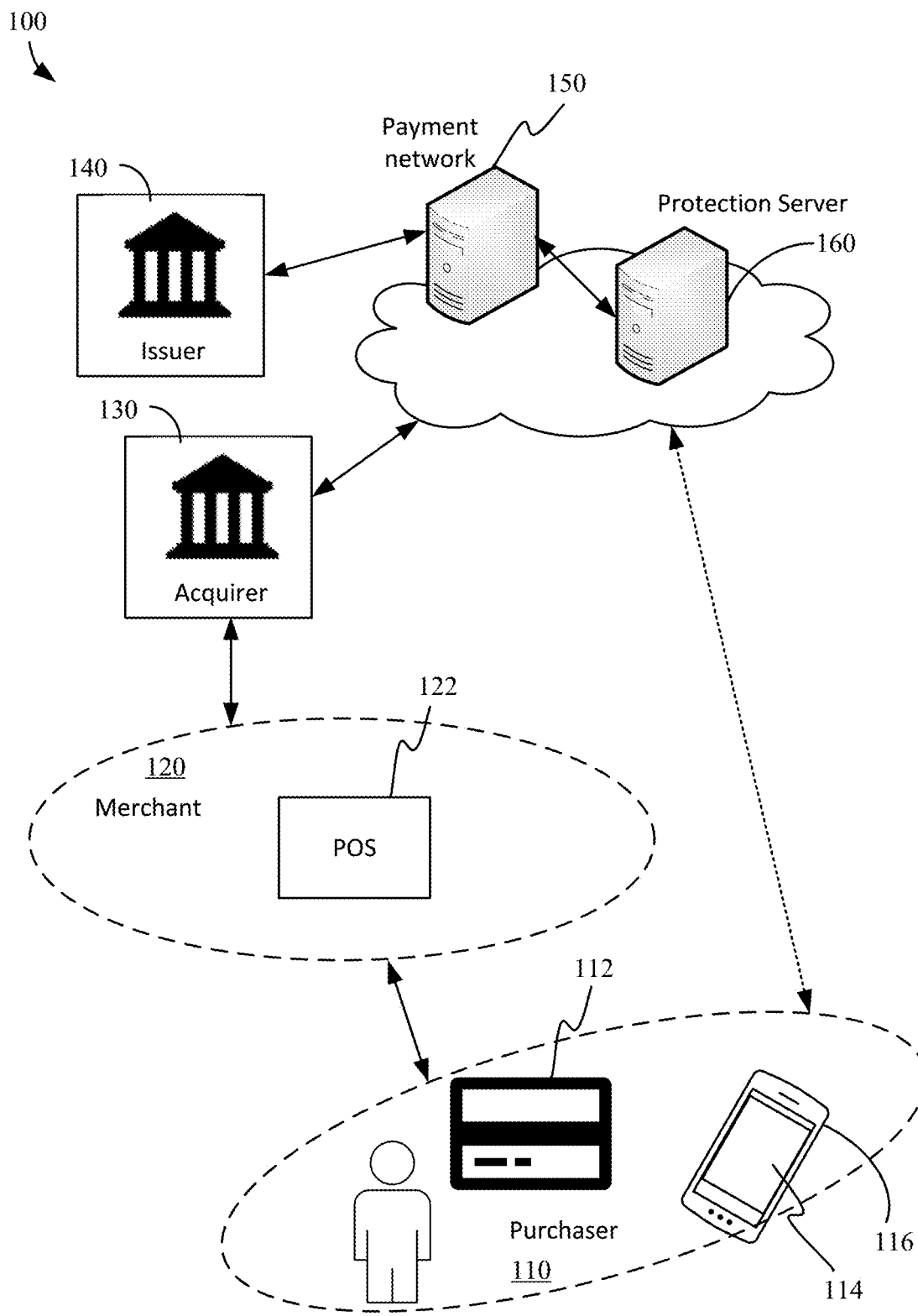
FIG. 1 illustrates an example operating environment to which the present disclosure for relay resistance protection can be applied.

FIG. 1 illustrates an example operating environment to which the present disclosure for relay resistance protection can be applied. Referring to FIG. 1, an operating environment 100 can include a cardholder or purchaser 110, a merchant 120, an acquirer 130 that processes payments on behalf of the merchant 120, at least one issuer 140 that provides payment cards (e.g., physical or virtual) to the cardholder 110, a payment card network 150 (and corresponding token service providers) that routes transaction information, and a protection server 160 that can be part of or in communication with the payment card network 150.

When making a payment for a monetary transaction at a merchant 120, the cardholder 110 may use a payment device such as a physical payment card 112 or a virtual payment card (e.g., via a wallet application 114) using a computing device such as a mobile phone 116 (or laptop computer, tablet computer, or wearable computing device such as watches or glasses). Examples of a physical payment card 112 includes a credit card, a debit card, and a gift card. In some cases, the physical payment card 112 supports contactless payments with respect to a point of sale (POS) terminal 122. For example, the physical payment card 112 may have an embedded chip and antenna or may be in the form of a fob. For the virtual payment card 114/116, the computing device may perform contactless payment on behalf of the mobile wallet application by communicating via RF, near field, or other wireless communication with the POS terminal 122.

During a typical purchase, the cardholder 110 requests a monetary transaction with a merchant 120 to purchase a product or service. The merchant 120 initiates the monetary transaction using the POS terminal to receive from the cardholder 110 payment card information. The merchant 120 transmits transaction information, including the payment card information, to the acquirer 130 via the POS terminal 122. The acquirer 130 receives the transaction information from the merchant 120. The acquirer 130 may include a processor that forwards the transaction information to an appropriate payment card network 150. The payment card network 150 routes the transaction information to the appropriate issuer 140. The issuer 140 manages and verifies the payment card information and provides an authorization or pre-authorization, which is then routed via the payment card network 150 to the acquirer 130. The acquirer 130 transmits the authorization to the merchant 120, completing the monetary transaction.

As mentioned above, contactless payments can suffer from relay attacks. A protection server 160 is provided that can support online authentication and protection from relay attacks before proceeding with the monetary transaction. In some cases, the POS terminal 122 communicates directly with the protection server 160. In some cases, the POS terminal 122 communicates with the protection server 160 via the acquirer 130. In some cases, the POS terminal 122 communicates with the protection server 160 via the payment network 150 (which may be supported through communication with the acquirer 130).

It should be understood that any information about a user or a user's computing device would be collected according to appropriate privacy and security considerations. For example, for information to be collected about a user's computing device, the user would provide consent to the collection of that information. In addition, personally identifiable information data may be removed.

Figure 2:
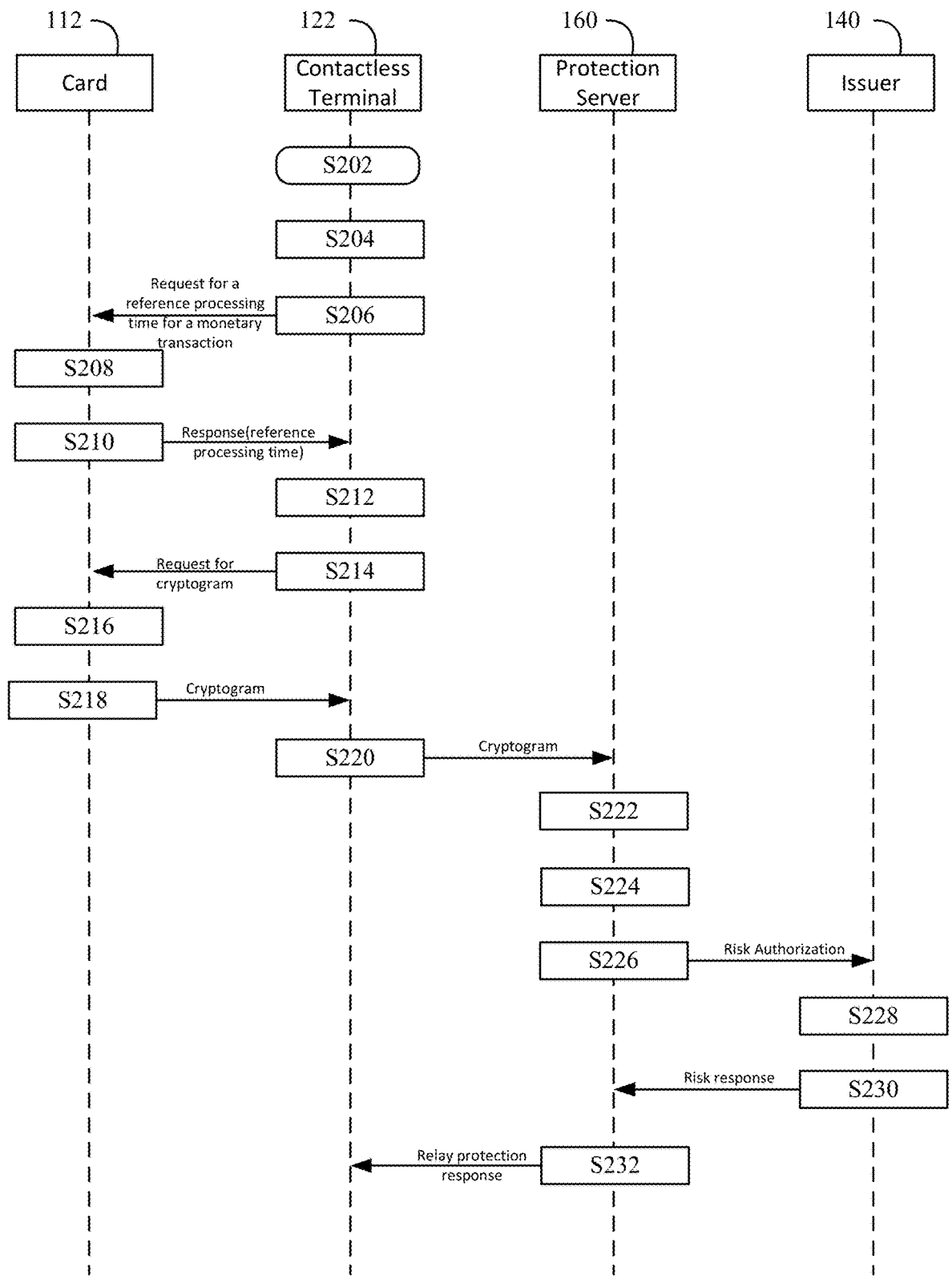
FIG. 2 illustrates a signal diagram for an implementation of relay resistance protection for payment with a physical card.

FIG. 2 illustrates a signal diagram for an implementation of relay resistance protection for payment with a physical card. The illustrated processes can be carried out in the operating environment 100 of FIG. 1, for example, with payment card 112, terminal 122, protection server 160, and issuer 140.

At S202, POS terminal 122 can initiate relay resistance protection. In some cases, the relay resistance protection illustrated in FIG. 2 may be initiated in response to receiving a request at a POS for a monetary transaction. The initiation of relay resistance protection can include starting a timer (S204) and transmitting a request for a reference processing time for a monetary transaction (S206). In some implementations of operation S204, POS terminal 122 starts a stopwatch (or timer) to set the first time to a default value, such as zero. In other implementations of operation S204, POS terminal 122 uses an internal clock to record a current time in a memory as the first time. The request for a reference processing time for a monetary transaction can be considered a send response command. In an example implementation of a request for a reference processing time for a monetary transaction, POS terminal 122 transmits to the card 112 an ERRD (exchange relay resistance data) command at S206. The ERRD command can include a random number as part of the command message since the relevant response data is the processing times and not necessarily the other data that may be part of the response data for the ERRD command.

Upon receiving the request for the reference processing time for a monetary transaction, card 112 (and particularly the IC at card 112) can process the request/command (S208) and send (S210) a response, which includes a reference processing time indicating an amount of time taken to perform the command associated with the request. For example, when the request for the reference processing time for the monetary transaction is the ERRD command, the card 112 can generate response data, including the reference processing time, during operation S208. For physical cards, such as card 112, the processing times for certain operations are relatively stable and predictable since the ICs at the card generally perform a limited number of operations and contain a relatively small number of devices (as compared to computing devices that are used to execute mobile wallet applications such as described with respect to computing device 116 with application 114).

POS terminal 122 receives the reference processing time from the card 112 and, at operation S212, determines a measured processing time. The measured processing time is determined based on the time from transmitting the request for the reference processing time to the card 112 to receiving the reference processing time from the card 112 (e.g., an amount of time from a sending by a source—in this case the POS terminal 122—of the command to send the response to a reception by the source—in this case the POS terminal 122—of the reference processing time). For example, the terminal 122 can determine the measured processing time using the timer that was started at operation S204 and stopped when the reference processing time was received. The difference between the start time and the stop time is the measured processing time. The POS terminal 122 then transmits a request for an application cryptogram (S214). The request for the application cryptogram includes the measured processing time as part of the message.

The card 112 receives the request for the application cryptogram and processes the request/command, for example by generating (S216) a cryptogram using the measured processing time. Examples of a cryptogram include a limited-use key (LUK) or a single key (SUK) password. In some implementations, the card 112 signs the measured processing time. This signature can use, for example, Triple DES (i.e., the Triple Data Encryption Algorithm) or AES (Advanced Encryption Standard) and a MAC (message authentication code) cryptogram. The card 112 then sends (S218) the application cryptogram to the POS terminal 122, which sends (S220) an online authorization request including the cryptogram to, for example, a protection server 160. In some cases, prior to sending the cryptogram to the protection server 160, the terminal 122 may verify that the measured processing time used by the card 112 to generate the cryptogram was not altered by a rogue device. For example, the terminal 122 can compare the measured processing time value received from the card 112 (and used to compute the cryptogram) with the original measured processing time value the terminal sent to the card 112 in operation S214. If the measured processing time value from the cryptogram is determined to be altered with respect to the original measured processing time, the terminal 122 can immediately decline the transaction.

The protection server 160 receives the online authorization request including the cryptogram. The cryptogram and associated information received by the protection server 160 provides the measured processing time and the reference processing time that were generated at the card 112 and terminal 122.

At S222, the protection server 160 verifies the application cryptogram. The cryptogram can be verified by using the key information/signature from the card 112. When the data used for computing the cryptogram is different from the data received to the terminal, it is likely that the data was altered by a rogue device and verification fails. The verification step S222 can be a conventional verification process such as described with respect to EMV standards (the global standard for credit and debit payment cards based on chip card technology), where there are three different types of application cryptograms that can be generated by the card and the type is indicated in the cryptogram information data transmitted with the application cryptogram. If the verification step fails, communications (not shown) can be initiated to decline payment. In some cases, the protection server 160 only verifies the timings (e.g., for cases where the protection server 160 does not include the keys) and the Issuer verifies the cryptogram.

If the verification step passes, the protection server 160 proceeds to the next step. Using the information provided from the cryptogram, the protection server 160 performs a determination whether the measured processing time exceeds the reference processing time (S224). The determination can allow for certain tolerances in the difference between the two values. In some cases, an artificial intelligence (AI) transaction analysis can be conducted by the protection server as part of the determination step if the measured processing time exceeds the reference processing time to better confirm whether the transaction may be fraudulent. In some cases, the AI transaction analysis can assign a different type of tolerance for the reference processing time due to the reference processing time being from a payment card with chip (since the value is expected to be relatively consistent across most cards).

In some cases, the protection server 160 transmits (S226) a request for a financial risk authorization to the issuer 140. The issuer can perform a fraud check (S228) to confirm whether or not there is fraudulent activity for the account and sends (S230) a response to the protection server 160. Advantageously, the availability of communication between the protection server 160 and the issuer 140 enables the issuer to be updated with information regarding additional sources of fraud.

Based on the determination of step S224 and optionally the response from the issuer, the protection server 160 transmits (S232) an online authorization response (which includes the "relay protection response") to the terminal 122. The online authorization response authorizes or declines the monetary transaction. Thus, relay resistance protection can be provided for contactless cards. Further, a CDA mechanism is not required at the terminal 122.

Figure 3:
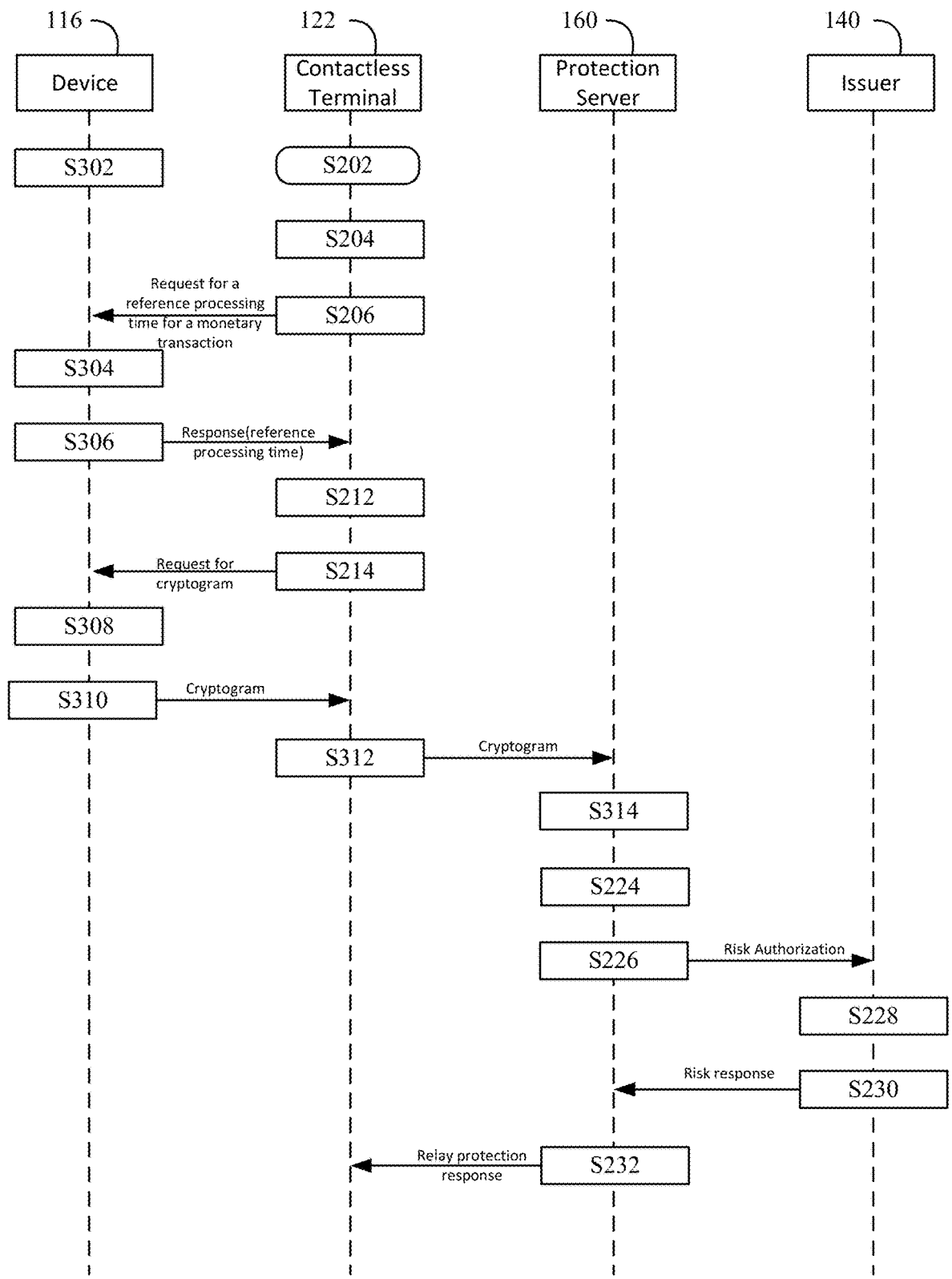
FIG. 3 illustrates a signal diagram for an implementation of relay resistance protection for payment with a virtual card.

FIG. 3 illustrates a signal diagram for an implementation of relay resistance protection for payment with a virtual card. The illustrated processes can be carried out in the operating environment 100 of FIG. 1, for example, with computing device 116, terminal 122, protection server 160, and issuer 140. The processes for relay resistance protection illustrated in the example of FIG. 3 can include similar processes as described with respect to the physical card scenario of FIG. 2. However, computing devices 116 tend to have inconsistencies in terms of performance, and by extension in terms of reference timings communicated to the terminal, between devices or even between different uses of the same device. Therefore, it can be challenging to minimize false positives and false negatives. For example, the processing time for performing a command can vary from one model of device to another, because the user has many applications open simultaneously (e.g., the user is paying while a video player is running), or because the CPU speed is limited (because the device is in low-power economy mode. It can be challenging to define a reference processing time when there are so many variables that could change the processing time.

Accordingly, artificial intelligence learning can be incorporated on the computing device 116 in association with wallet application 114 to determine valid processing timings for processing the command, as illustrated in operation S302. For example, machine learning can be used with several input variables such as device power mode, CPU speed, and latency with an NFC controller (the latency being measurable by sending a ping command to the NFC controller and measuring the latency time using a timer). The AI implemented in the wallet application of the computing device 116 can be trained for a certain period of time with different measured processing times (for performing the command as described with respect to operation S208 of FIG. 2) that are requested, for example, at every transaction during the training period. Based on the measured processing times (corresponding to the reference processing time) and the state of the computing device at the time of the measurement (e.g., battery level, number of applications opened at that time, etc.), the AI at the computing device can keep track of the variables and define a maximum processing time in the different device states. In some cases, the AI includes supervised learning (e.g., of time measured by a terminal that the payment device communicates with) and regression analysis using dependent variables of processing times (e.g., to process a command and transmit a response) and independent variables of conditions of the payment device (e.g., number of applications open, battery level, power mode, etc.). During the learning/training period (and later), the timing measured by the POS terminal 122 may also be requested for each transaction and communicated to the device 116, for example, during a GENERATE AC command as part of the CDOL1 Related Data (such as described by EMV specifications).

For example, the processor of the computing device 116 performs artificial intelligence (AI) learning to learn the reference processing times. In particular, the processor can implement an AI model (see e.g., AI module 928 of FIG. 9B) to learn the reference processing times based on an operating system version of the computing device 116, a current level of the portable power source, or a number (and/or type) of applications concurrently running on the computing device 116. For example, one version of an OS for the computing device 116 might run faster than another and the AI model can account for changes over time with respect to the versions of the OS on the computing device 116. In addition, computing device 116 might run more slowly to conserve power, when the current level of the portable power source (e.g., the batter) is less than a predetermined threshold, such as 15%. The AI model can account for changes with respect to power level as well as the change that may occur due to battery life/decay. Further, the AI model can account for the types and number of open applications. For example, the processor of the computing device 116 can use AI learning based on an identity of a particular application (or applications) running on the computing device 116, such as when the particular application significantly impacts the processing time of the computing device 116 since some applications consume more resources than other applications. In some embodiments, a histogram is used.

Figure 7:
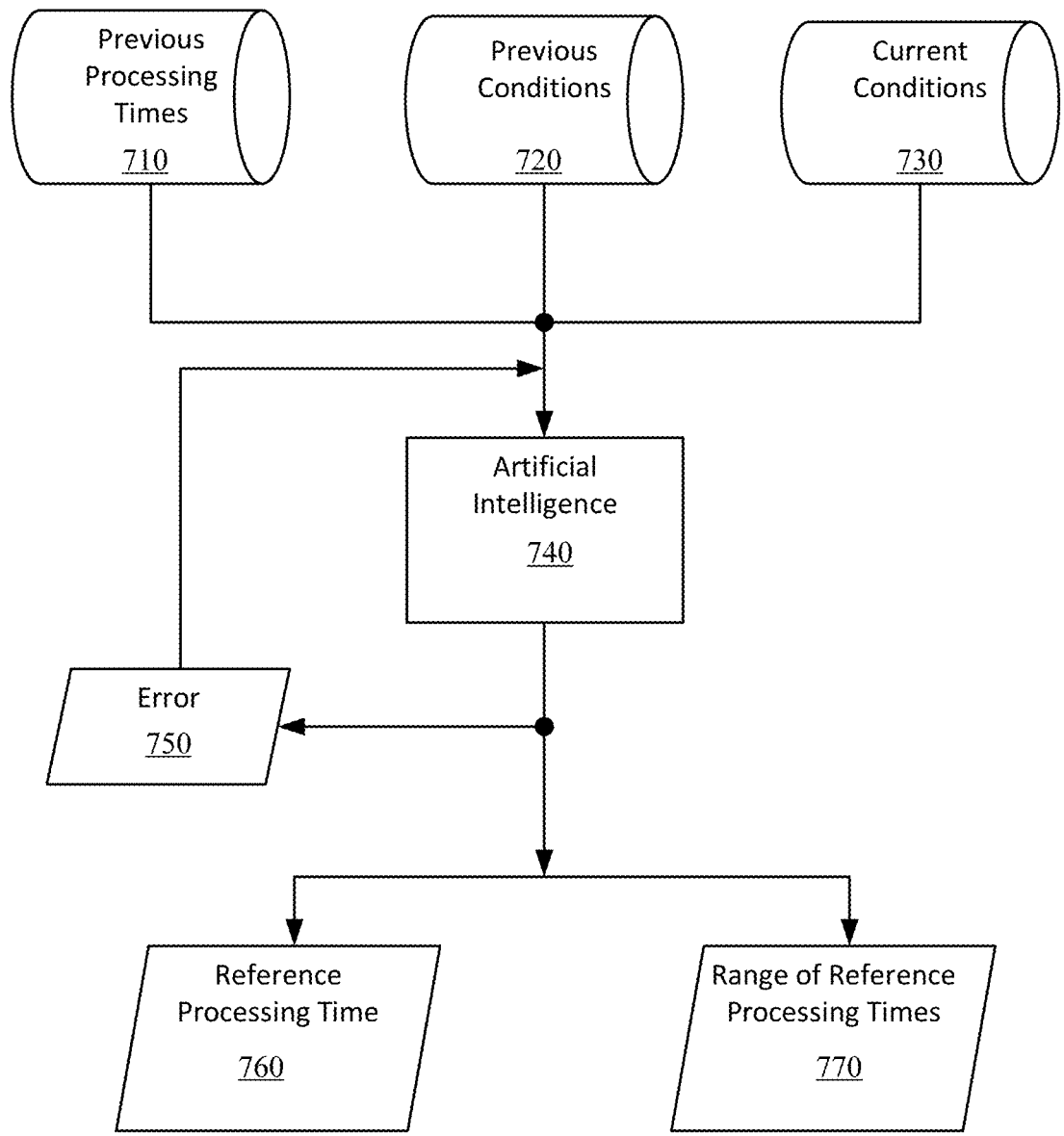
FIG. 7 illustrates an example artificial intelligence model implemented at a payment device.

In some implementations, the AI training is implemented by as explained with respect to FIG. 7. In some cases, a neural network can be used and trained on prior contactless transactions of the payment device (e.g., the computing device 116).

Accordingly, when the learning stage is complete (e.g., after a certain number of transactions for each device state), the computing device 116 can define an appropriate reference processing time (or range of reference processing times), to be used in response to the request for a processing time (e.g., the send response command). In some cases, the wallet application of the computing device 116 can include a default/initial value for the reference processing time that is a "safe" high maximum reference processing time in order to guarantee that the transaction is not denied during the training period.

As illustrated in FIG. 3, similar to that described with respect to FIG. 2, at S202, POS terminal 122 can initiate relay resistance protection, for example, in response to receiving a request at a POS for a monetary transaction. The initiation of relay resistance protection can include starting a timer (S204) and transmitting a request for a reference processing time for a monetary transaction (S206).

Upon receiving the request for the reference processing time for a monetary transaction, computing device 116 (e.g., executing wallet application 114) can process the request/command (S304). As mentioned above, the time to process the command can be used to train the AI (and in some cases, can be continually performed even after the initial training period). After processing the request/command, the computing device 116 can send (S306) a response, which includes a reference processing time indicating an amount of time taken to perform the command associated with the request. Here, the value included as the reference processing time can actually be a processing time generated by the AI at the wallet application that takes into account the state of the computing device 116. This AI generated processing time can be a specific value used in place of the processing time for performing the request/command. In some cases, this specific value is an average processing time or a maximum "safe" processing time value (where "safe" refers to a value that would not cause the transaction to be denied). In some cases, both the actual processing time and the AI generated processing time are provided with the response in operation S306. In some cases, other details regarding device state can be provided with the response in operation S306.

POS terminal 122 receives the reference processing time from the computing device 116 and, as described with respect to FIG. 2, at operation S212, determines a measured processing time. The POS terminal 122 then transmits a request for an application cryptogram (S214). The request for the application cryptogram includes the measured processing time as part of the message. For example, when the request for a reference processing time is an ERRD command, the request for the application cryptogram can include the unpredictable number sent in the ERRD command, so that the card 112 can determine whether there is an inconsistency in case of a man-in-the-middle attack.

The computing device 116 receives the request for the application cryptogram and processes the request/command, for example by generating (S308) a cryptogram using the measured processing time. A LUK password, a SUK password, Triple DES, AES cryptography, and/or a MAC cryptogram can be used, as some examples. The computing device 116 then sends (S310) the application cryptogram to the POS terminal 122, which sends (S312) an online authorization request including the cryptogram to, for example, a protection server 160. In some cases, prior to sending the cryptogram to the protection server 160, the terminal 122 may verify that the measured processing time used by the computing device 116 to generate the cryptogram was not altered by a rogue device. For example, the terminal 122 can compare the measured processing time value received from the computing device 116 (and used to compute the cryptogram) with the original measured processing time value the terminal sent to the computing device 116 in operation S214. If the measured processing time value from the cryptogram is determined to be altered with respect to the original measured processing time, the terminal 122 can immediately decline the transaction.

The protection server 160 receives the online authorization request including the cryptogram. The cryptogram and associated information received by the protection server 160 provides the measured processing time and the reference processing time (which may include one or both of the actual processing time and the AI generated processing time and any other information such as device state) that were generated at the computing device 116 and terminal 122.

At S314, the server verifies the application cryptogram based on the signature provided from the computing device 116. Operation S314 can be as described with respect to operation S222 of FIG. 2.

If the verification step passes, the protection server 160 proceeds to the next step. As also described with respect to FIG. 2, using the information provided from the cryptogram, the protection server 160 performs a determination whether the measured processing time exceeds the reference processing time (S224). The determination can allow for certain tolerances in the difference between the two values. In some cases, an artificial intelligence (AI) transaction analysis can be conducted by the protection server as part of the determination step if the measured processing time exceeds the reference processing time to better confirm whether the transaction may be fraudulent. The AI can be trained to learn from the consumer's usual behavior (and associated device states) and/or other consumers with similar devices over time, as discussed in more detail with respect to FIG. 8.

In some cases, the protection server 160 transmits (S226) a request for a financial risk authorization to the issuer 140. The issuer can perform a fraud check (S228) to confirm whether or not there is fraudulent activity for the account and sends (S230) a response to the protection server 160. Advantageously, the availability of communication between the protection server 160 and the issuer 140 enables the issuer to be updated with information regarding additional sources of fraud. For example, the regular authorization request/response can be overloaded to convey this information by adding results of a RRP (relay-resistant protocol) analysis (as performed according to EMVCo standards) and/or a score of confidence in regards of a potential RRP fraud.

Based on the determination of step S224 and optionally the response from the issuer, the protection server 160 transmits (S232) an online authorization response ("relay protection response") to the terminal 122. The online authorization response authorizes or declines the monetary transaction. Thus, relay resistance protection can be provided for virtual cards/computing devices.

Figure 4A:
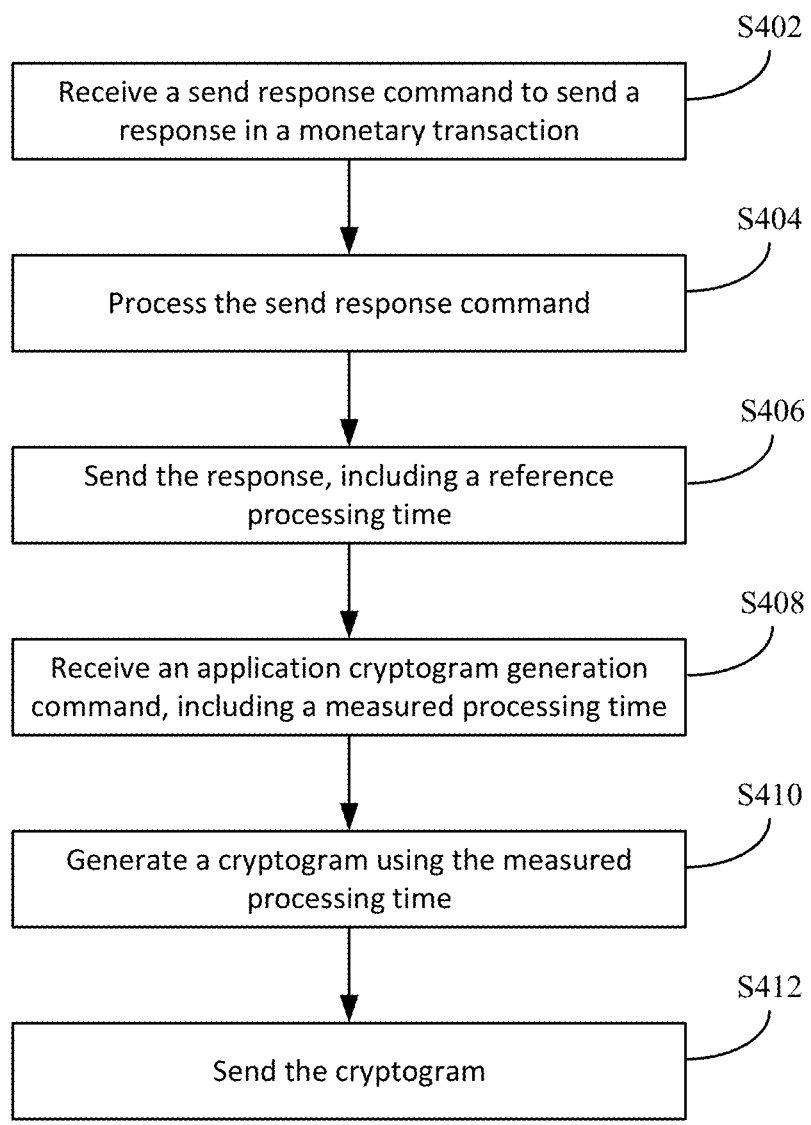
FIG. 4A illustrates an example process carried out by a payment device.

FIG. 4A illustrates an example process carried out by a payment device. A method 400 carried out at a payment device, such as card 112 or computing device 116, can include receiving (S402) a send response command to send a response in a monetary transaction; processing (S404) the send response command; sending (S406) the response, which includes a reference processing time indicating an amount of time taken to process the command; receiving (S408) an application cryptogram generation command including a measured processing time that indicates an amount of time from a sending by a source of the command to send the response to a reception by the source of the reference processing time; generating (S410) a cryptogram using the measured processing time; and sending (S412) the cryptogram.

Figure 4B:
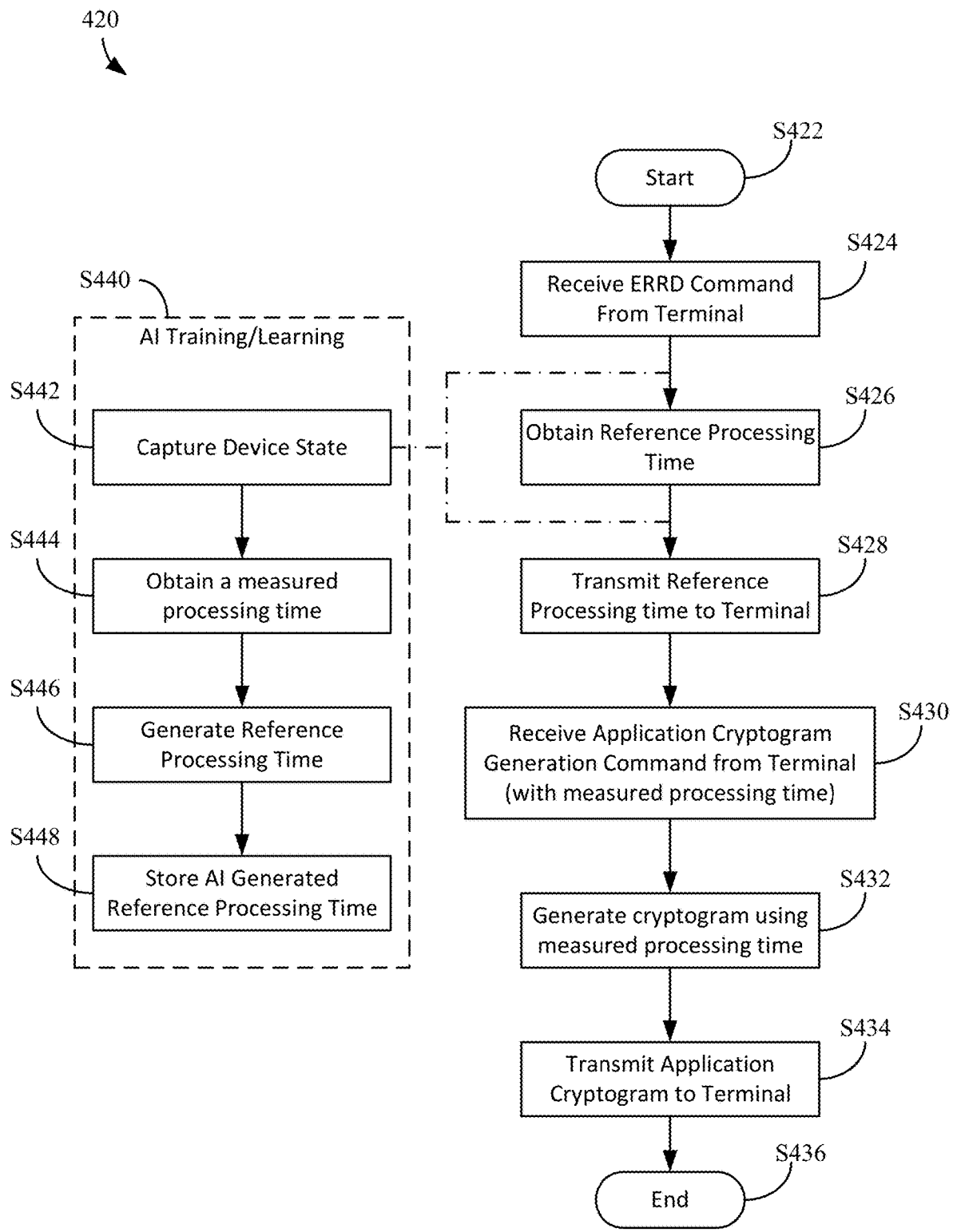
FIG. 4B illustrates an example implementation of the process illustrated in FIG. 4A.

FIG. 4B illustrates an example implementation of the process illustrated in FIG. 4A. The process 420 of FIG. 4B starts at S422. At S424, the payment device receives an ERRD command as the send response command from a terminal (e.g., terminal 122). In response to receiving the ERRD command, the payment device processes the ERRD command. The processing of the ERRD command generally entails retrieving data from volatile memory or storing data in volatile memory of the payment device. Usually the ERRD command includes a random number (e.g., terminal relay resistance entropy) and the response includes a random number (e.g., device relay resistance entropy, which may be constructed by a selected four bytes of a dynamic number) and timing estimates (min time for processing relay resistance, max time for processing relay resistance, and device estimated transmission time for relay resistance). The ERRD data stored in the volatile memory can include the random number received with an ERRD command and the dynamic number that increments (and which is used as the random number for the response). For the case where the payment device is a physical card, the timing for processing used in the response can be issuer-generated max and min values for the IC used in the card. Thus, in S426, the reference processing time of the max and min values is obtained from storage and, in S428, transmitted to the terminal with the rest of the ERRD response.

For the case where the payment device is a computing device, the reference processing time obtained in S426 can include a "safe" max reference processing time during the training stage (so that the transaction will not be denied in case the computing device is operating slower than expected), or the average or trained value of the reference processing time generated using AI learning (described in more detail at S440).

For both the physical card scenario and the computing device scenario, the reference processing time represents the amount of time to process the request from the terminal and send the reference processing time in response to the command.

In S430, the payment device receives from the terminal a command to generate an application cryptogram (e.g., a GENERATE AC command). In or along with this command, the payment device receives from the terminal the measured processing time (which is measured by the Terminal). As previously described, the measured processing time is measured from a time the terminal sends the ERRD command until the terminal receives the reference processing time.

In S432, the payment device generates the application cryptogram using the measured processing time received from the terminal. As discussed previously, the application cryptogram can be generated, for example, using a SUK or a LUK.

In S434, the payment device transmits the application cryptogram to the terminal, which ends (S436) process 420.

As mentioned above, for a computing device scenario, process 420 can further include AI Training/Learning step S440. During the training phase (and/or during continued learning), the device captures the device state (S442) when the ERRD command is received in operation S424 and obtains a measured processing time (S444). In some cases, the measured processing time obtained during the training phase is obtained by using a local timer as an input to generate a max reference processing time. In some cases, such as when the AI is implemented using certain supervised training algorithms, the measured processing time is also or alternatively obtained from the Terminal (e.g., when the application cryptogram generation command (and measured processing time) is received from the terminal in operation S430). When the measured processing time is obtained from the Terminal as part of the supervised learning algorithm, this value is used to update the reference processing time for a subsequent use of the payment device. The reference processing time can either be generated at the time of obtaining the reference processing time (S426) or generated prior to receiving the ERRD command from the Terminal and stored for the device to read at the time of obtaining the reference processing time (S426).

The device can then generate (S446) a reference processing time based on the device state and measured processing time information and store (S448) the generated reference processing time. The generated reference processing time can be updated during the training process (and even during continued learning). In this manner the AI generated reference processing time (and valid range for the reference processing time) can be made available for use when the payment device obtains the reference processing time in operation S426.

Figure 5A:
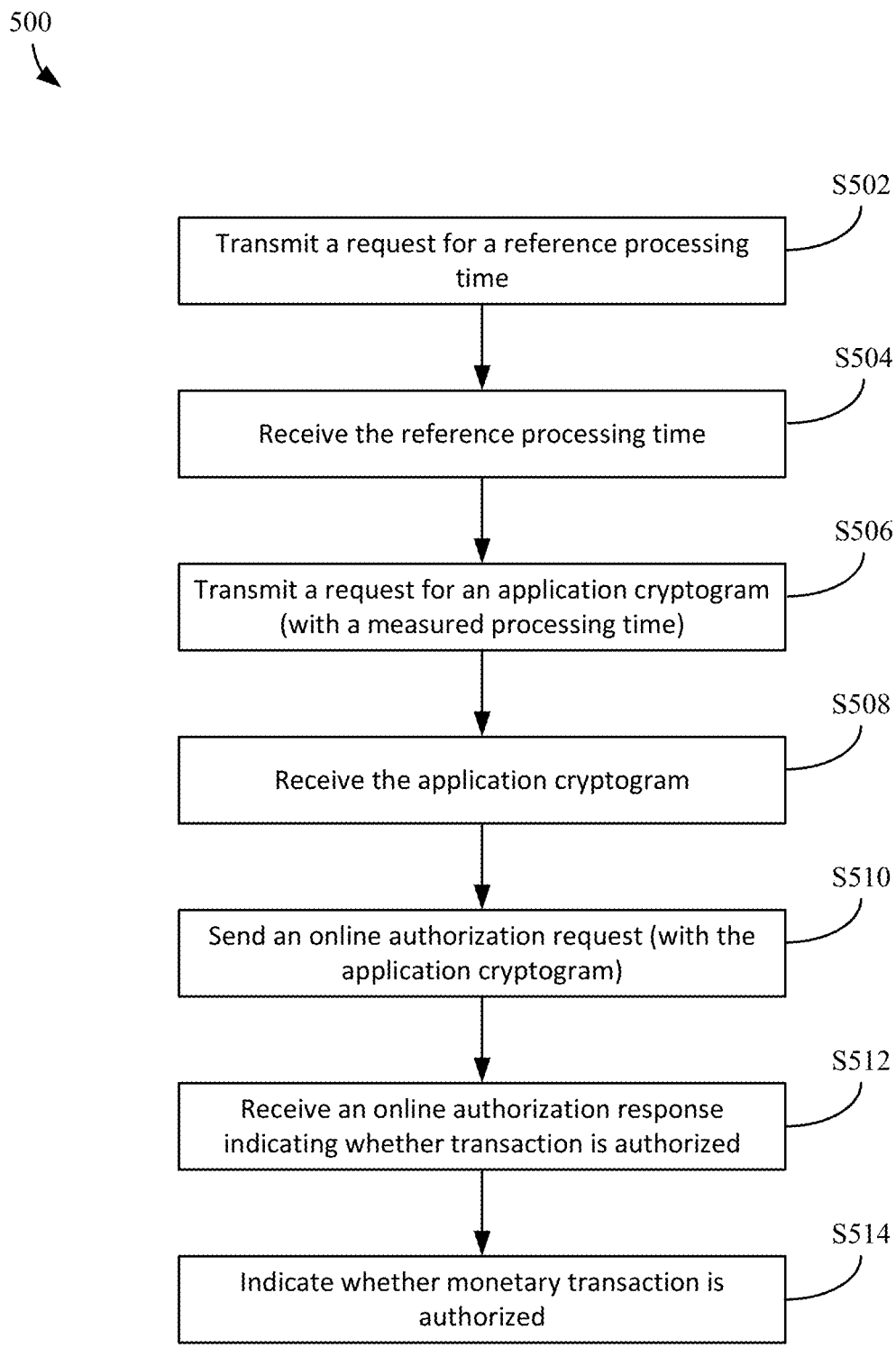
FIG. 5A illustrates an example process performed by a contactless terminal.

FIG. 5A illustrates an example process performed by a contactless terminal. A method 500 carried out at a contactless terminal, such as POS terminal 122, can include transmitting (S502) a request for a reference processing time for a monetary transaction (e.g., a "send response command" such as described with respect to FIG. 4A); receiving (S504) the reference processing time; and transmitting (S506) a request for an application cryptogram (e.g., an "application cryptogram generation command" such as described with respect to FIG. 4A), the request for the application cryptogram including a measured processing time. In some cases, the POS terminal 122 can calculate the measured processing time as an amount of time between transmitting the request for the reference processing time and receiving the reference processing time. The method can further include receiving (S508) the application cryptogram; sending (S510) an online authorization request including the application cryptogram and indicating the measured processing time and the reference processing time; receiving (S512) an online authorization response that indicates whether the transaction is authorized; and, in some cases, indicating (S514) (e.g., via a display at the terminal) whether the monetary transaction is authorized.

Figure 5B:
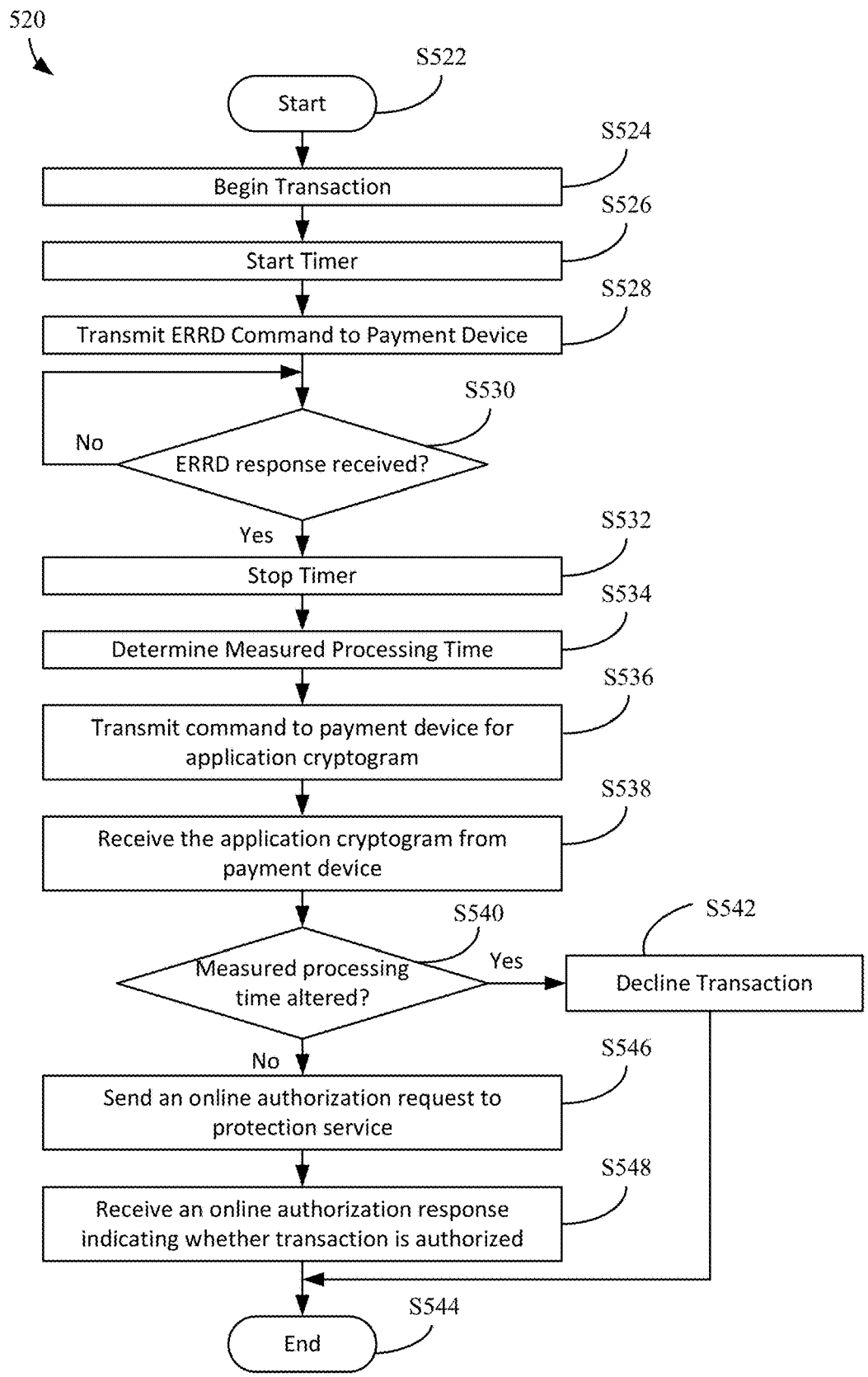
FIG. 5B illustrates an example implementation of the process illustrated in FIG. 5A.

FIG. 5B illustrates an example implementation of the process illustrated in FIG. 5A. The process 520 of FIG. 5B starts at S522.

In S524, a terminal, such as POS terminal 122, receives a signal indicating the beginning of a monetary transaction. In one implementation, the POS terminal 122 receives a signal from an attached cash register. In another implementation, the POS terminal 122 receives a physical button press from a human. In yet another implementation, the POS terminal 122 receives a signal from a payment device (e.g., payment device 112, 116).

Then, in S526, the POS terminal 122 starts a timer. In some implementations, the timer is a stopwatch that begins at, for example, a default value such as zero. In other implementations, a processor of the POS terminal 122 performs functions of the timer. For example, the processor can store in a memory a current time of global timer and begin incrementing.

In S528, the POS terminal 122 transmits an ERRD command as the send response command to the payment device.

POS terminal 122 uses the value of the timer started in S526 to represent the time at which the POS terminal 122 transmits the ERRD command in S528. Thus, the relationship between the starting of the timer and a transmission of the ERRD command can be provided in any suitable manner. For example, the POS terminal 122 can transmit the ERRD command and subsequently start the timer. As an another example, the timer can be modified with suitable values (e.g., a duration of a transmission queue) to provide other benefits (e.g., more accurate timing, lower power consumption, faster transmission time) to the relationship between the beginning of the timer and the transmission of the ERRD command.

In S530, POS terminal 122 waits for the response from the payment device, for example by determining whether the ERRD response, with reference processing time, has been received from the payment device. If POS terminal 122 determines it has not received the ERRD response from the payment device, the POS terminal 122 returns to S530, thereby awaiting the reception of such a response. If the POS terminal 122 determines in S530 that it received the ERRD response from the payment device, then the POS terminal 122 proceeds to S532.

In S532, POS terminal 122 stops the timer started in S526; and determines the measured processing time in S534. In some implementations in which the timer is a stopwatch, the timer reports a duration that elapsed since the timer began, thereby measuring the measured processing time. In one such implementation, the timer (or a processor) determines the elapsed duration by subtracting the default value at which the timer was started in S526 from a current value of the timer as of S532. In some implementations in which the processor of the POS terminal 122 performs the functions of the timer, the processor retrieves from a memory the time stored in S526 and subtracts that time from a value at which the timer was stopped in S532. Thus, POS terminal 122 determines the measured processing time in S534

After determining the measured processing time in S534, the POS terminal 122 transmits to the payment device an application cryptogram generation command in S536. The application cryptogram generation command can include or otherwise be accompanied by the measured processing time determined by the POS terminal 122 in S534. As previously described, the payment device is intended to generate the application cryptogram using the measured processing time.

In S538, POS terminal 122 receives from the payment device the application cryptogram. In one implementation, POS terminal 122 receives a signed measured processing time from the payment device. The POS terminal 122 then determines whether the measured processing time was altered in S540. The POS terminal 122 can make this determination by comparing the measured processing time determined in S534 with the processing time extracted from the received application cryptogram. If the POS terminal 122 determines that the measured processing time has been altered in S540, the POS terminal can decline the transaction in S542 and the process 520 can end S544. If the POS terminal 122 determines that the measured processing time has not been altered in S540, the POS terminal proceeds to S546.

In S546, POS terminal 122 transmits an online authorization request to a protection service, such as available from protection server 160. The online authorization request includes the measured processing time, the reference processing time received by the POS terminal 122 with the ERRD response, and cryptogram data. The online authorization request can in some cases further include additional information. The protection service 160 performs the relay attack determination and, in S548, the POS terminal receives the online response from the protection service, indicating whether the transaction is authorized.

The process 520 performed by the POS terminal 122 then concludes in S544.

Figure 6A:
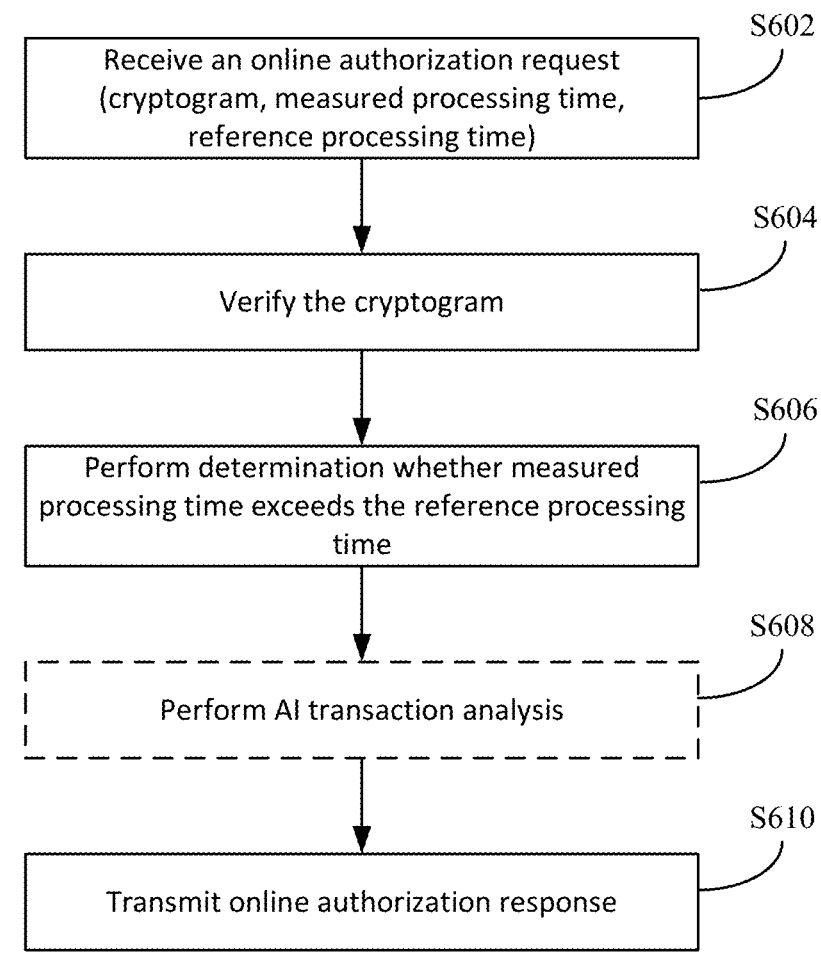
FIG. 6A illustrates an example process performed by a protection server.

FIG. 6A illustrates an example process performed by a protection server. A method 600 carried out at a protection server, such as described with respect to protection server 160 of FIG. 1, can include receiving (S602) an online authorization request including a cryptogram, a measured processing time, and a reference processing time; verifying (S604) the cryptogram; and performing (S606) a determination whether the measured processing time exceeds the reference processing time. The verifying (S604) of the cryptogram can be performed before determination S606 because if the cryptogram is invalid, the data used for computing the cryptogram is different from the data received by the terminal, so it is assumed that the data was altered in the middle by a rogue device and the transaction can be declined without proceeding to other steps. If the cryptogram is correct but it is determined that the measured processing time exceeds the reference processing time, then the server can perform a further analysis to determine whether the transaction should be declined. For example, the server can consider whether the measured processing time significantly exceeds the reference time.

In some cases, an artificial intelligence (AI) transaction analysis is performed (S608) to provide a confidence assessment regarding the determination in S606. The AI transaction analysis can, for example, evaluate the extent that the measured processing time may exceed the reference time and whether the received information is consistent with expected values for normal operation. In some implementations, the AI transaction analysis training is implemented by a neural network trained on prior contactless transactions of payment devices both for individual operations and across a community and as detailed later with regard to FIG. 8. Method 600 can be completed by transmitting (S610) an online authorization response based on the determination (e.g., including operation S606 and optional S608), where the online authorization response authorizes or declines a monetary transaction.

Figure 6B:
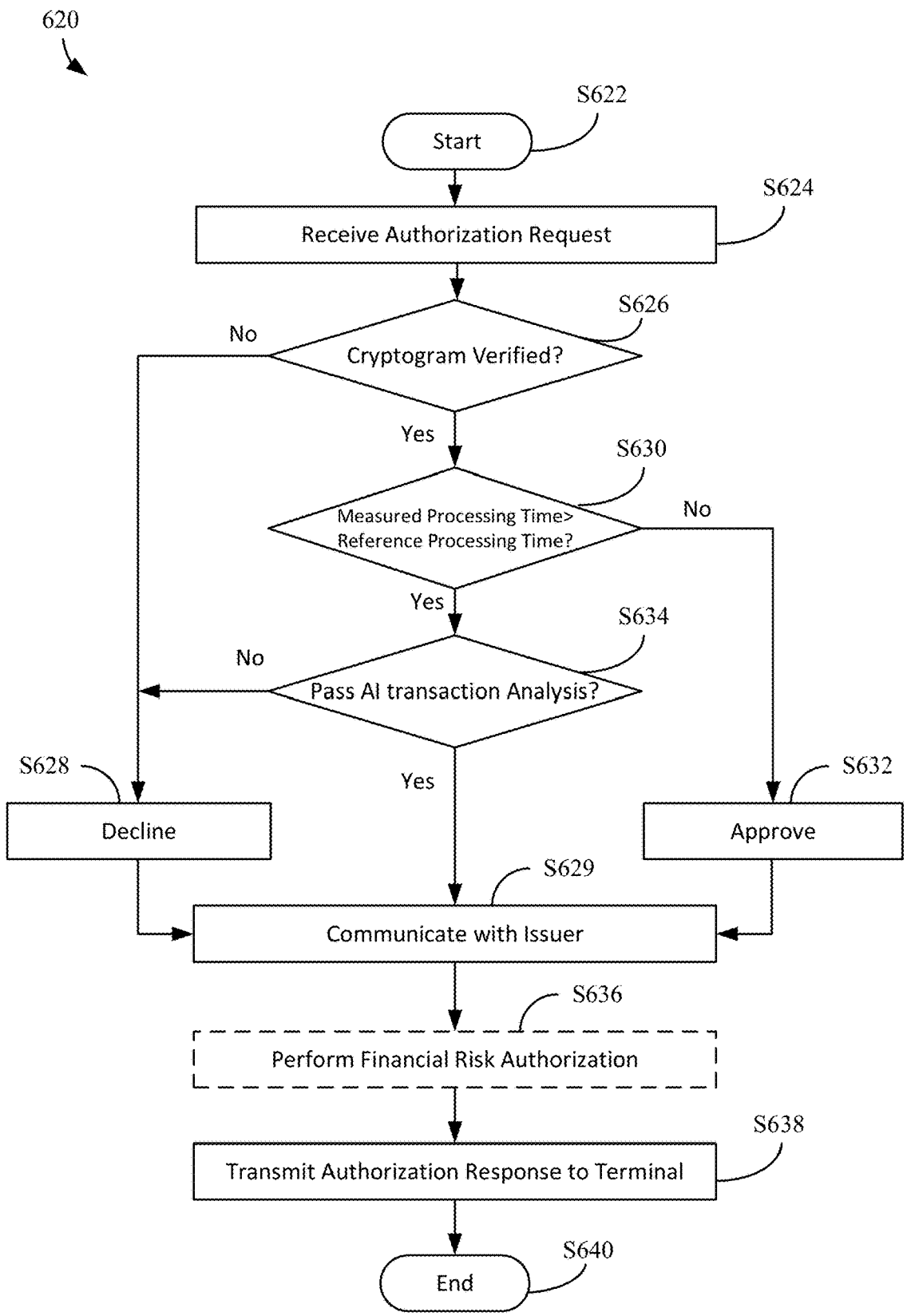
FIG. 6B illustrates an example implementation of the process illustrated in FIG. 6A.

FIG. 6B illustrates an example implementation of the process illustrated in FIG. 6A. The process 620 of FIG. 6B starts at S622. In S624, a protection server, such as protection server 160, receives an online authorization request from, for example, a contactless terminal such as POS terminal 122. The online authorization request includes the measured processing time, the reference processing time, and the cryptogram. In some implementations, the online authorization request also includes transaction information including, but not limited to, an identifier of the terminal, an identifier of the payment device, and/or an amount of money.

In S626, the server 160 then determines in a verification process whether the cryptogram is a valid cryptogram. The verification process is known in the art under the EMV standards and is not further explained here.

If server 160 determines in S626 that the cryptogram cannot be verified, then the server advances to S628 and declines authorization of the transaction. In some cases, the transaction request, along with the information that the server 160 has declined the authorization of the transaction due to the cryptogram not being verified, is communicated (S629) to the Issuer managing the cardholder's account for the Issuer to determine further action (and the Issuer may override the decline or perform some other processes).

If server 160 determines in S626 that the cryptogram is verified (and is valid), then the server determines in S630 whether the measured processing time exceeds the reference processing time provided with the cryptogram.

If server 160 determines in S630 that the measured processing time does not exceed the reference processing time, then the server advances to S632 and indicates approval from the timing analysis. This indication of approval from the timing analysis can be communicated (S629) to the Issuer in order to obtain financial authorization for the transaction.

If server 160 determines in S630 that the measured processing time does exceed the reference processing time, then the server determines, in S634, whether the measured processing time passes an AI transaction analysis. An example AI transaction analysis is illustrated and described with respect to FIG. 8.

If server 160 determines the measured processing time does not pass the AI transaction analysis in S634, then the server proceeds to S628 and declines authorization of the transaction. In this example implementation, the AI transaction analysis can be considered to have not been passed when the results of the AI transaction analysis have a confidence value for a potential fraud above a certain threshold. In some cases, the transaction request, along with the information that the server 160 has declined the authorization of the transaction due to not passing the AI transaction analysis in S634, is communicated (S629) to the Issuer managing the cardholder's account for the Issuer to determine further action (and the Issuer may override the decline or perform some other processes).

If server 160 determines the measured processing time does pass the AI transaction analysis in S634, similar to step S632, the approval from the AI transaction analysis is communicated (S629) to the Issuer in order to obtain financial authorization for the transaction. In some cases, "passing' the AI transaction analysis can include both having a confidence value for potential fraud that is not quite at or above the certain threshold for potential fraud and having a confidence value for there being no fraud at a certain threshold.

A financial risk authorization may optionally be performed S636. In some cases, optional S636 is performed regardless of the outcome of S630 and S634 in order to check whether there is a financial risk indicator on the cardholder's account.

In some implementations, the server 160 performs the financial risk authorization itself. In other implementations, the server transmits a request for the financial risk authorization to an issuer (e.g., along with the transaction request in operation S629). The issuer receives the request for the financial risk authorization and determines whether to authorize the financial risk. The issuer then transmits a financial risk authorization response to the server. The server receives the financial risk authorization response from the issuer.

After the optional financial risk authorization is performed (S636), the server advances to S638.

In S638, server 160 transmits an online authorization response to the POS terminal 122. If server 160 determined in S628 or S636 that the authorization response should be declined, then the online authorization response transmitted in S638 is a decline. If server 160 determined in S632 or S636 that the authorization response should be approved and the transaction is authorized (as indicated by communication with Issuer in S629), then the online authorization response transmitted in S638 is an approval. In some cases, the authorization response can further include confidence values for the assessment of decline or approve.

Server 160 then concludes the process in S640.

As previously mentioned, it can be difficult to predict the reference processing time for a payment device other than a card. Accordingly, in some implementations, the payment device can learn its reference processing time using AI, such as illustrated with respect to FIG. 7.

FIG. 7 illustrates an example AI model implemented at a payment device. Previous processing times 710 of transactions of the payment device (e.g., such as described with respect to operations S304 of FIG. 3 and S402 of FIG. 4A) and previous conditions 720 at the payment device at the time of those transactions are inputs to AI 740.

Previous conditions 720 can include state information of the device such as the battery level of the payment device at the time of a transaction, the CPU speed, the operating system (OS) version installed on the payment device at the time of the transaction, the number of applications concurrently running on the payment device at the time of the transaction, the names of applications concurrently running on the payment device at the time of the transaction, the versions of the applications running on the payment device at the time of the transaction, and the version of the wallet application that performed the transaction on the payment device.

In a training mode of AI 740, AI 740 receives previous processing times 710 and previous conditions 720.

In some implementations, AI 740 attempts to predict a processing time of a transaction from previous conditions 720. To do so, the AI 740 can perform an iterative process such as determining an error 750 between the predicted processing time and an actual processing time 710 of the transaction. Thus, AI 740 can train itself by learning how the previous conditions 720 generally (and, specifically, the battery level, the OS version, the number of concurrently-running applications, the names of concurrently-running applications, the versions of the concurrently-running applications, and the wallet application version) affect the processing times 710 resulting from those conditions.

In an implementation mode, AI 740 can receive current conditions 730 at the time of a monetary transaction. AI 740 can determine an expected reference processing time 760 or a range 770 for the expected reference processing time, based on the training of the AI 740.

Figure 8:
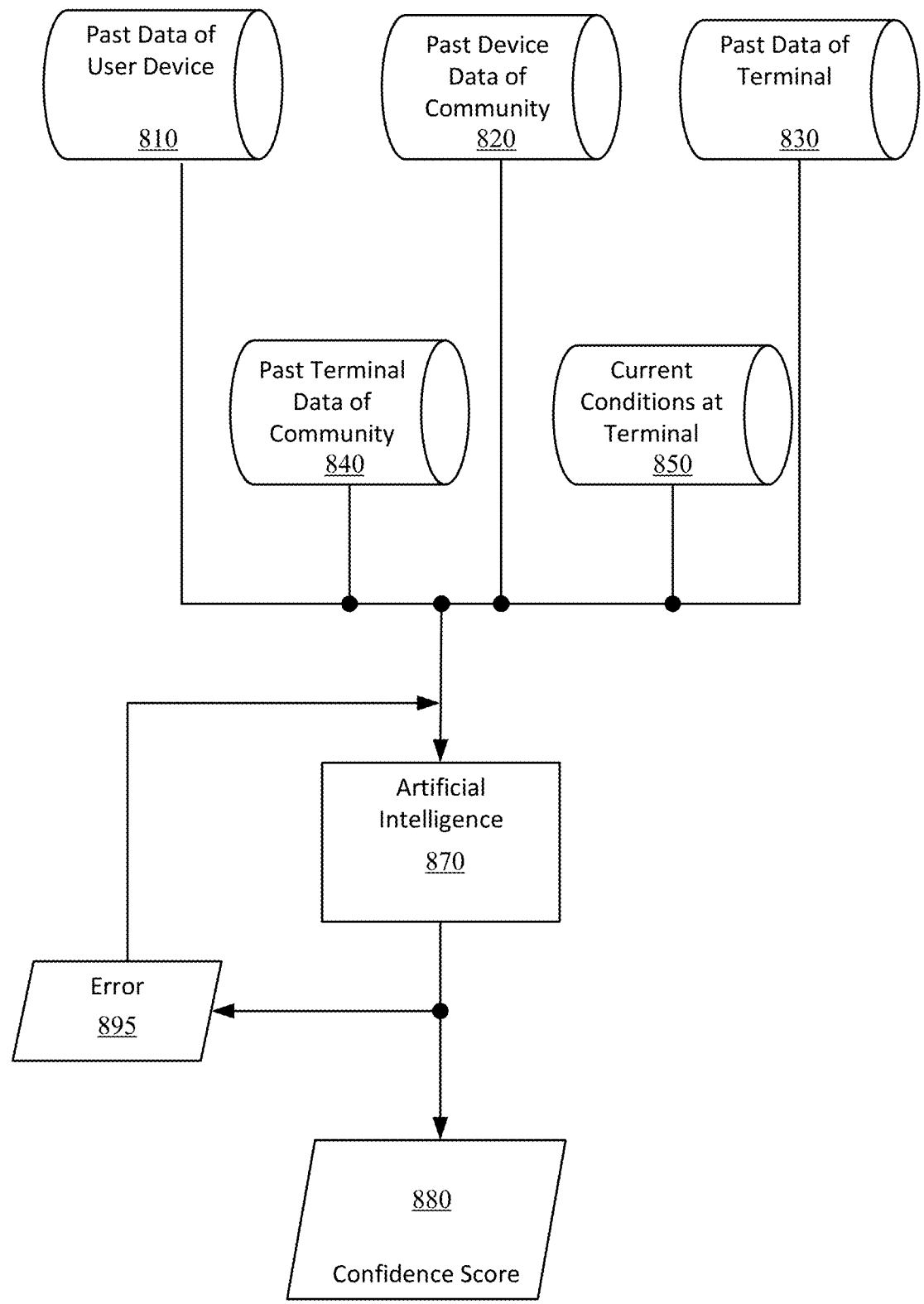
FIG. 8 illustrates an example artificial intelligence model implemented by a protection server.

FIG. 8 illustrates an example AI model implemented by a protection server. AI 870 can receive past data 810 of a payment device, past data 820 of multiple payment devices (community data—which may be aggregated data that includes data of the current payment device), past data 830 of POS terminal 122, past data 840 of multiple terminals, and current conditions 850 at the terminal to perform analysis and to train the model.

In some implementations, AI 870 also receives an identifier of the payment device and/or an identifier of the terminal from the terminal when the online protection server receives the online authorization request. In one implementation, the identifier of the payment device uniquely identifies the payment device from all other payment devices, such as by using Internet Protocol version 6 (IPv6), a serial number, an international mobile subscriber identity (IMSI), international mobile equipment identity (IMEI), or a card number (e.g., a credit card number). Along with the identifier of the payment device, other features may be included such as a type (e.g., smartphone or card), an operating system (e.g., Android or iOS), an application developer (e.g., MASTERCARD, Apple, or PayPal), an application name and revision number (e.g., 1.0, 1.1, or 2.0), a battery manufacturer, or other identifying aspect of the payment device.

In some of such implementations, AI 870 can retrieve past device data 810 from a data resource based on the identifier of the payment device.

In some implementations, AI 870 can instead or additionally receive an identifier of the terminal when the online protection server receives the online authorization request.

In one implementation, the identifier of the terminal uniquely identifies the terminal from all other terminals again using, for example, a serial number, IMSI, or IMEI. In another implementation, the identifier identifies a plurality of terminals of which the terminal is one. For example, the plurality might be a type (e.g., NFC or QR reader), an operating system of the terminal, a developer (e.g., MASTERCARD, Apple, or PayPal) of an application used by the terminal in the monetary transaction, an application name and revision number (e.g., 1.0, 1.1, or 2.0) of the application used for the monetary transaction, or other identifying aspect of the terminal. In some implementations, AI 870 receives amounts of money of past transactions and further performs analysis thereon.

Past data 810 of the payment device can include previous measured processing times of monetary transactions of this payment device and past conditions (device state) at this payment device at the times of those monetary transactions. In some implementations, past data 810 of the payment device can also include previous reference processing times of the payment device. In some cases, the past data 810 can include conditions at the payment device just prior to the transaction, for example, as communicated by a user's wallet application (e.g., 114 to protection server 160 as illustrated by the optional communication in FIG. 1). These conditions at the payment device can include the battery level of the payment device at the time of a monetary transaction, the OS version installed on the payment device at the time of the monetary transaction, the number of applications concurrently running on the payment device at the time of the monetary transaction, the names of applications concurrently running on the payment device at the time of the monetary transaction, the names and versions of the applications running on the payment device at the time of the monetary transaction, and the version of the wallet application that performed the monetary transaction on the payment device. It should be understood that any information about the user's device provided to the protection server would be subject to permissions by the user and stored according to appropriate privacy guidelines.

Past data 820 of multiple payment devices includes aggregated data of previous measured processing times of monetary transactions of payment devices and past conditions at the respective payment devices at the time of those monetary transactions. In some implementations, past data 820 of the multiple payment devices can also include previous reference processing times of the respective payment devices.

Past data 830 of this terminal includes previous measured processing times of monetary transactions of payment devices that use this terminal and past conditions at this terminal at the times of those monetary transactions. Past data 830 can be particularly useful in cases in which a terminal deviates from expected measured processing times of all terminals. For example, a terminal having faulty sensors might lead to slower measured processing times than other terminals.

Past data 840 of multiple terminals includes aggregated data of previous measured processing times of monetary transactions at terminals and past conditions at the respective terminals at the time of those monetary transactions. Past data 840 can be particularly useful in cases in which the terminals' measured processing times deviate from expected measured processing times. For example, a software or firmware update of a terminal device might lead to slower (or faster) measured processing times than expected. Similarly, a faulty internal clock might alter the expected measured processing time.

Current conditions 850 at the terminal can include a power source status (e.g., wall-powered, battery-powered, battery status) of the terminal at the time of the monetary transaction, the OS version installed on the terminal at the time of the monetary transaction, the names of applications concurrently running on the terminal at the time of the monetary transaction, the versions of the applications running on the terminal at the time of the monetary transaction, and the version of the application that performed the monetary transaction on the terminal.

By receiving the identifier of the payment device and/or the identifier of the terminal, AI 870 can compare previous measured processing times of similar payment devices and terminals. In other words, AI 870 can effectively limit the effect on its reference processing time excluding dissimilar payment devices and terminals that might have substantially different measured processing times. Accordingly, the data set available for the AI 870 can more accurately reflect expected processing times for the payment device and terminal performing the monetary transaction under consideration.

In an example training mode of AI 870, AI 870 receives past data of all payment devices (e.g., past data 810 of a predetermined payment device and past data 820 of other payment devices) and past data of all terminals (e.g., past data 830 of a predetermined terminal and past data 840 of other terminals). Thus, the identity of the payment device and terminal of the monetary transaction under consideration need not be known during the training mode.

AI 870 then attempts to predict from the past data of all payment devices and all terminals a processing time of a monetary transaction about which the AI 870 received information in the past data 810, 820, 830, 840.

For example, AI 870 determines an error 895 between the predicted processing time and an actual processing time of a monetary transaction in the past data of the payment devices and terminals. AI 870 receives error 895 in a feedback loop. Thus, AI 870 can train itself by learning how conditions in the past data 810 and past data 820 generally (and, specifically, the battery level, the OS version, the number of concurrently-running applications, the names of concurrently-running applications, the versions of the concurrently-running applications, and the wallet application version) affect the processing times resulting from those conditions. More specifically, AI 870 can try to minimize the error 895.

In an implementation mode, AI 870 can receive the reference processing time and measure processing time values received from the authorization request along with current conditions 850 of the terminal; and can determine whether the difference between the measured processing time and the reference processing time indicates the transaction should be declined, based on the training of the AI 870 in the training mode of the AI 870. For example, the measured processing time might exceed the reference processing time but be within range of that terminal or an aspect of the current state of the payment device in the monetary transaction.

Thus, AI 870 can produce a confidence value/score 880 indicating likelihood that the difference between the reference processing time and the measured processing time is acceptable or not acceptable By introducing this analysis, the AI 870 can return a score 880 from "confident that the transaction is a regular transaction" to "likely a real relay attack." The server can use this score to decide whether to continue the transaction and ask for financial authorization from the Issuer or to decline the transaction because the fraud suspicion is too high. In some cases, the server sends the request to the Issuer for financial authorization, along with the score, so that the Issuer can perform its own risk assessment.

Figure 9A:
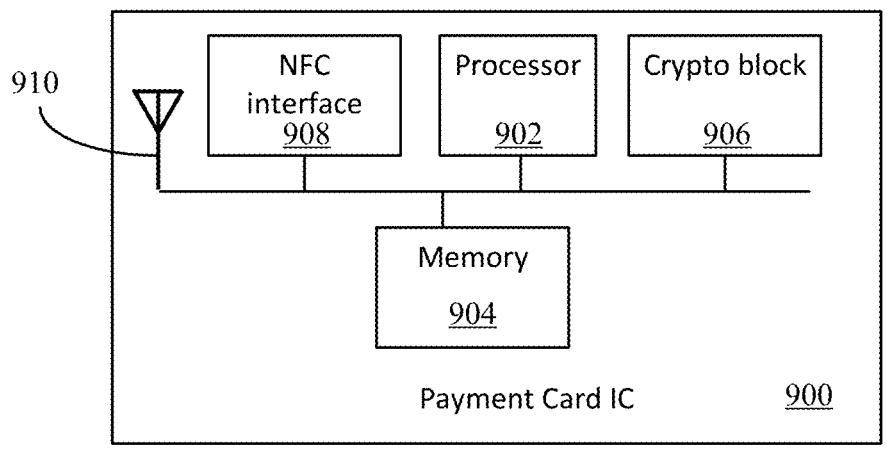
FIG. 9A illustrates components of an example payment card IC.

FIG. 9A illustrates components of an example payment card IC. Referring to FIG. 9A, a payment card chip 900 that supports contactless payments can include a processor 902, memory 904, crypto block 906, near field communication (NFC) interface 908, and antenna 910. The processor 902 executes instructions stored in the memory 904, including for processes 400 such as described with respect to FIG. 4A as well as relevant processes described with respect to FIGS. 2, 3, and 4B. The crypto block 906 performs the secure processes such as for authentication and cryptogram generation. NFC interface 908 and antenna 910 enable the payment card to be a contactless payment device.

Figure 9B:
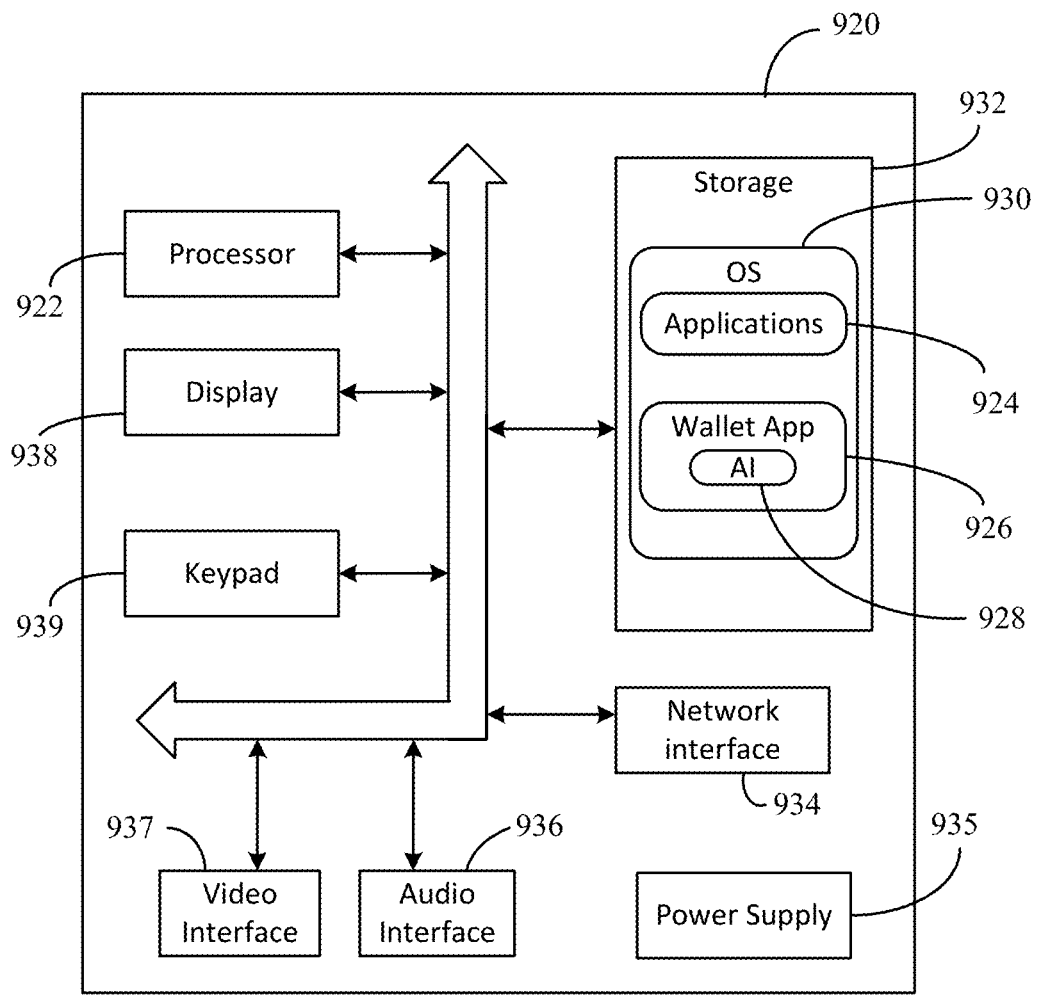
FIG. 9B illustrates components of an example computing device that may be used for contactless payments.

FIG. 9B illustrates components of an example computing device that may be used for contactless payments. Referring to FIG. 9B, computing device 920 can represent, for example, a mobile phone, tablet, smart watch, or other mobile computing device. Computing device 920 can be considered a payment device when used to perform contactless payment processes.

Computing device 920 includes a processor 922 that executes instructions of one or more application programs 924, wallet application 926, and/or operating system 930 that are stored in storage 932. The processor 922 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 934).

The one or more application programs 924, including wallet application 926, may be stored in storage be loaded into storage 932 and run on or in association with the operating system 930. Examples of application programs include phone dialer programs, e-mail programs, Internet browser programs, messaging programs, game programs, and the like. Wallet application 926 can include a learning/AI module 928 with instructions for performing processes such as described with respect to training/learning step S440 of FIG. 4B.

In various implementations, data/information stored via the computing device 920 may include data caches stored locally on the device (e.g., in storage 932 or another local storage resource) or the data may be stored on any number of storage media that may be accessed by the device via the network interface 934.

Computing device 920 has a power supply 935, which may be implemented as one or more batteries and/or an energy harvester (ambient-radiation, photovoltaic, piezoelectric, thermoelectric, electrostatic, and the like). Power supply 935 may further include an external power source, such as an AC adapter or a powered docking cradle that supplements or recharges the batteries.

Computing device 920 may also include a network interface 934 that performs the function of transmitting and receiving communications such as radio frequency communications. The network interface 934 facilitates wireless connectivity between computing device 920 and the "outside world," via a communications carrier or service provider. Transmissions to and from the network interface 934 are conducted under control of the operating system 930, which disseminates communications received by the network interface 934 to application programs 924 and vice versa. In some cases, near field communication (NFC) or other communication interface devices (not shown) can be included. NFC can be used by computing device 920 for communicating payment and transaction information from the wallet application 926 to a contactless payment supported terminal.

An audio interface 936 can be used to provide audible signals to and receive audible signals from the user. For example, the audio interface 936 can be coupled to speaker to provide audible output and a microphone to receive audible input, such as to facilitate a telephone conversation. A speaker may also be incorporated so that a user may interact with the computing device via voice commands.

Computing device 920 may further include video interface 937 that enables an operation of an optional camera (not shown) to record still images, video stream, and the like. A camera may also be used to capture gestures used for interacting with the computing device.

Visual output can be provided via a display 938. In some cases, the display 938 may be a touch screen display. A keypad 939 can also be included for user input. The keypad 939 may be a physical keypad or a soft keypad generated on display 938.

It should be understood that any computing device implementing computing device 920 may have more or fewer features or functionality than described and is not limited to the configurations described herein.

Figure 9C:
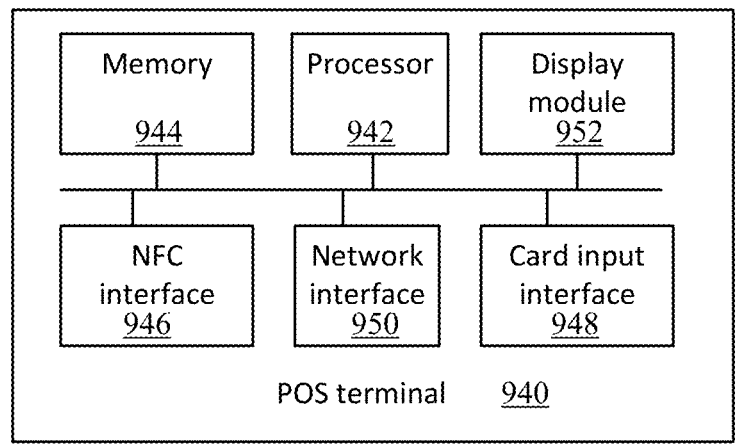
FIG. 9C illustrates components of an example terminal.

FIG. 9C illustrates components of an example terminal. Referring to FIG. 9C, a POS terminal 940 can include a processor 942, memory 944, a payment interface embodied as a NFC interface 946 and/or card input interface 948, a network interface 950, and display module 952. The POS terminal 940 may have more or fewer components depending on implementation. The memory 944 can store instructions that, when executed by processor 942, direct the POS terminal to perform processes such as process 500. The NFC interface 946 supports contactless payment communications with a device and the card input interface 948 supports insertion of a payment card for contact-based payment communications with a device. The POS terminal 940 can communicate with other devices and systems, including a protection server, via the network interface 950. Information (including whether a transaction was approved or declined) can be output for viewing on the display module 952.

Figure 9D:
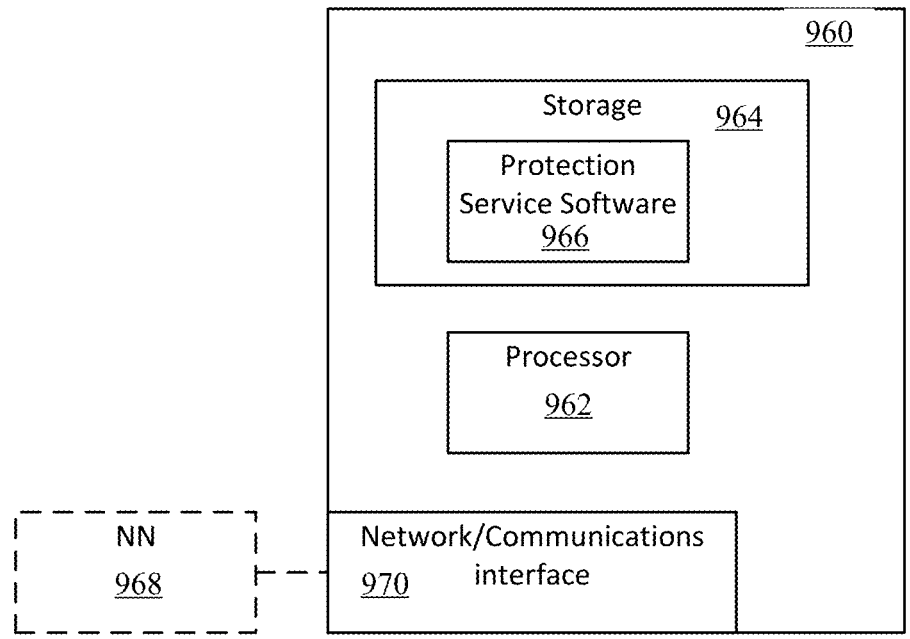
FIG. 9D illustrates components of an example protection server.

FIG. 9D illustrates components of an example protection server. A protection server can be embodied as computing system 960. Computing system 960 may be implemented within a single computing device or distributed across multiple computing devices or sub-systems that cooperate in executing program instructions. In some implementations, the system 960 can include one or more blade server devices, standalone server devices, personal computers, routers, hubs, switches, bridges, firewall devices, intrusion detection devices, mainframe computers, network-attached storage devices, smartphones and other mobile telephones, and other types of computing devices. The system hardware can be configured according to any suitable computer architectures such as a Symmetric Multi-Processing (SMP) architecture or a Non-Uniform Memory Access (NUMA) architecture.

The system 960 can include a processor 962, which can include one or more hardware processors and/or other circuitry that retrieves and executes software from storage system 964. Processor 962 can be implemented within a single processing device, chip, or package but can also be distributed across multiple processing devices, chips, packages, or sub-systems that cooperate in executing program instructions.

Storage system 964 can include any computer readable storage media readable by processor 962 and that stores software (including Protection Service Software 966) and data (e.g., history and current data for training and use by artificial intelligence). Storage system 964 can be implemented as a single storage device but can also be implemented across multiple storage devices or sub-systems co-located or distributed relative to each other. Storage system 964 can include additional elements, such as a controller, that communicate with processor 962. Storage system 964 can also include storage devices and/or sub-systems on which data and/or instructions are stored.

Protection Service Software 966 is stored on storage system 964 and includes instructions for at least partially performing processes such as described with respect to process 600 of FIG. 6A and process 620 of FIG. 6B. In some cases, Protection Service Software 966 includes instructions for processes described with respect to FIG. 8

In some cases, system 960 can include or communicate with a neural network system 968 that executes artificial intelligence/machine learning processes (some of which may be included as part of protection service software 966).

System 960 can include a communications interface 970 that provides one or more communication connections and/or one or more devices that allow for communication between system 960 and other computing systems. In implementations where the system 960 includes multiple computing devices, the system can use one or more communications networks that facilitate communication among the computing devices. For example, the one or more communications networks can include or be a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

In some embodiments, system 960 can host one or more virtual machines. In some implementations, those virtual machines at least partially perform processes defined by the Protection Service Software 966.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Although the subject matter has been described in language specific to structural features and/or acts, the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A point of sale (POS) terminal, comprising:
a processor;
memory;
a payment interface;
a network interface; and
instructions stored on the memory that when executed by the processor direct the POS terminal to:
transmit, via the payment interface to a payment device, a request for a reference processing time for a monetary transaction;
receive, via the payment interface from the payment device, the reference processing time;
calculate a measured processing time as an amount of time between transmitting the request for the reference processing time and receiving the reference processing time;
transmit, via the payment interface to the payment device, a request for an application cryptogram that includes the measured processing time and the reference processing time;
receive, via the payment interface from the payment device, the application cryptogram that includes the measured processing time and the reference processing time;
send, via the network interface to a protection server, an online authorization request including the application cryptogram that includes the measured processing time and the reference processing time; and
receive, via the network interface from the protection server, an online authorization response that indicates whether the transaction is authorized based on verification of the application cryptogram and a determination of fraud using the measured processing time and the reference processing time.

2. The POS terminal of claim 1, wherein the request for the reference processing time is a send response command in a form of an EXCHANGE RELAY RESISTANCE DATA (ERRD) command, wherein the reference processing time indicates an amount of time taken to process the ERRD command.

3. The POS terminal of claim 1, wherein the online authorization request further comprises a terminal identifier or a device identifier.

4. The POS terminal of claim 1, wherein the instructions to calculate the measured processing time direct the POS terminal to:
start a timer upon transmitting the request for the reference processing time;
stop the timer in response to receiving the reference processing time; and
determine the measured processing time based on the timer.

5. The POS terminal of claim 1, further comprising instructions that direct the POS terminal to:
upon receiving the application cryptogram, determine whether the measured processing time indicated by the application cryptogram has been altered; and
decline the monetary transaction if the reference processing time has been altered.

* * * * *